US007058116B2

(12) United States Patent
Moshavi et al.

(10) Patent No.: US 7,058,116 B2
(45) Date of Patent: Jun. 6, 2006

(54) RECEIVER ARCHITECTURE FOR CDMA RECEIVER DOWNLINK

(75) Inventors: Shimon Moshavi, Bet Shemesh (IL); Daniel Yellin, Raanana (IL); Yoni Perets, Petach-Tikva (IL); Tsofnat Hagin-Metzer, Nes-Ziona (IL)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 10/056,983

(22) Filed: Jan. 25, 2002

(65) Prior Publication Data

US 2003/0142732 A1 Jul. 31, 2003

(51) Int. Cl.
*H04B 1/69* (2006.01)
*H04B 7/10* (2006.01)

(52) U.S. Cl. ...................... 375/148; 375/347
(58) Field of Classification Search ............. 375/148, 375/130, 150, 147, 142, 144, 347, 31, 316, 375/267; 324/614
See application file for complete search history.

(56) References Cited

U.S. PATENT DOCUMENTS

| 6,167,282 | A | 12/2000 | Hunsberger | |
|---|---|---|---|---|
| 6,473,619 | B1 * | 10/2002 | Kong et al. | 455/456.1 |
| 2001/0014116 | A1 * | 8/2001 | Saito et al. | 375/148 |
| 2003/0013457 | A1 * | 1/2003 | Amerga et al. | 455/456 |
| 2003/0114179 | A1 * | 6/2003 | Smolyar et al. | 455/522 |
| 2003/0134652 | A1 * | 7/2003 | Ben-Eli | 455/515 |
| 2004/0042389 | A1 * | 3/2004 | Schiff | 370/208 |
| 2004/0184513 | A1 * | 9/2004 | Lundby et al. | 375/148 |
| 2004/0248581 | A1 * | 12/2004 | Seki et al. | 455/450 |

FOREIGN PATENT DOCUMENTS

WO   WO-0101602 A1   1/2001

OTHER PUBLICATIONS

"Physical Layer Procedure", *3GPP TS 25.214*, (Dec. 1, 2001), p. 24.
"Ad-hoc 9 Report", *TSG-RAN Working Group 1 Meeting # 3*, Nynashamn, Sweden, Retrieved From the Internet: www. 3gpp.org>, (Mar. 22-25, 1999), 1-4.
"CPICH Interference Cancellation as a Means for Increasing DL Capacity", *Proceedings of TSG-RAN Working Group 1, Meeting No. 17*, Stockholm, Sweden, Retrieved from the Internet: www. 3gpp.org>, (Nov. 21-24, 2000), p. 1-7.
Holma, H., et al., *In: WCDMA for UMTS*, John Wiley & Sons Ltd., England, (Jan. 1, 2000), p. 89-91.
Ojanpera, T., et al., *In: Wideband CDMA for third Generation Mobile Communications*, Aptech House, England, (Jan. 1, 1998), p. 46-47.

* cited by examiner

*Primary Examiner*—Khai Tran
(74) *Attorney, Agent, or Firm*—Schwegman, Lundberg, Woessner & Kluth, P.A.

(57) ABSTRACT

A receiver includes a searcher to identify pilot signals within a received signal and a pilot tracking unit to continuously track pilot signals identified by the searcher. The pilot signals tracked by the pilot tracking unit may include pilot signals associated with an affiliated base station as well as pilot signals associated with non-affiliated base stations. In at least one embodiment, the pilot tracking unit continuously tracks most or all of the pilot signals identified by the searcher.

61 Claims, 3 Drawing Sheets

RECEIVER ARCHITECTURE FOR CDMA RECEIVER DOWNLINK

BACKGROUND OF THE INVENTION

In a cellular communication system, a plurality of base stations is typically used to provide wireless communication services to mobile users within the system. Each base station will often service multiple users within a coverage region or cell associated with the base station. To allow multiple users to share a base station, a multiple access scheme is typically employed. One multiple access technique that is becoming increasingly popular is code division multiple access (CDMA). In a CDMA-based system, a plurality of substantially orthogonal codes (usually taking the form of pseudo-random noise sequences) or nearly-orthogonal codes (i.e., codes with low cross-correlations) are used to spread spectrum modulate user signals within the system. Each modulated user signal has an overlapping frequency spectrum with other modulated user signals in the system. However, because the underlying modulation codes are orthogonal (or nearly-orthogonal), each user signal is capable of being independently demodulated by performing a correlation operation on the composite signal using the appropriate code.

A mobile communication device within a CDMA-based cellular system will typically receive overlapping data-bearing signals associated with a plurality of users within the system. Some of the users may be located within a common cell as the mobile communication device and some of the users may be located in other cells. The mobile communication device is required to extract data from the composite received signal that is intended for delivery to a local user associated with the device. All signal components within the composite received signal other than the component carrying the local user data are considered interference by the mobile communication device because they interfere with the data extraction process. Various receiver architectures are in use or have been proposed for use within mobile communication devices in CDMA-based cellular systems. However, there is an ongoing need for novel receiver architectures for use in such devices.

DETAILED DESCRIPTION

In the following detailed description, reference is made to the accompanying drawings that show, by way of illustration, one or more specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
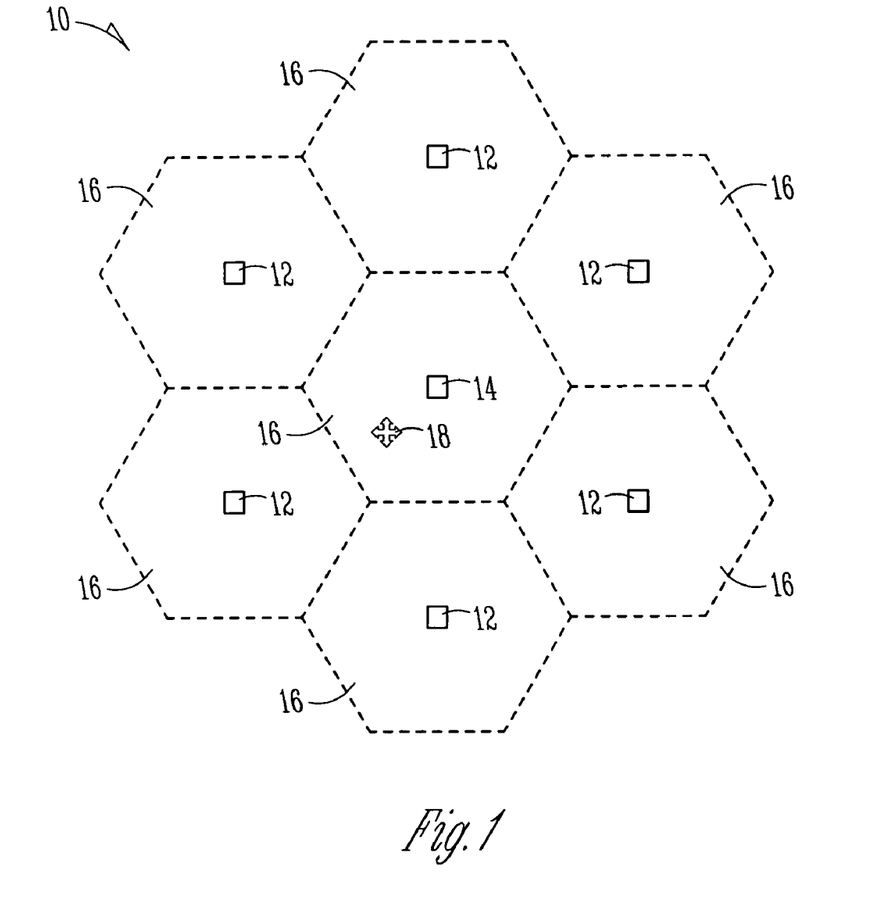
FIG. 1 is a simplified top view illustrating a cellular communication system.

FIG. 1 is a simplified top view illustrating a cellular communication system 10 in which the principles of the present invention may be practiced. As illustrated, the cellular communication system 10 includes a plurality of base stations 12, 14 that are physically distributed within an area. Each of the base stations 12, 14 has a corresponding coverage region or cell 16 within which the base station 12, 14 provides wireless communication services to mobile users. As used herein, the term "affiliated base station" refers to a base station that is presently providing communication services to a particular user. For example, with reference to FIG. 1, base station 14 is acting as the affiliated base station for mobile user 18 who is located within the cell 16 of base station 14. In some systems, it is possible to have more than one affiliated base station for a user during, for example, soft-handoff operations. Mobile user 18 will typically receive signals from a number of base stations 12 within the system 10 in addition to the affiliated base station 14. As described previously, in a CDMA-based system, the signals received from the various base stations may have overlapping frequency spectrums. As can be appreciated, these overlapping signals can negatively impact the quality of communication within the system 10 if not appropriately handled.

Figure 2:
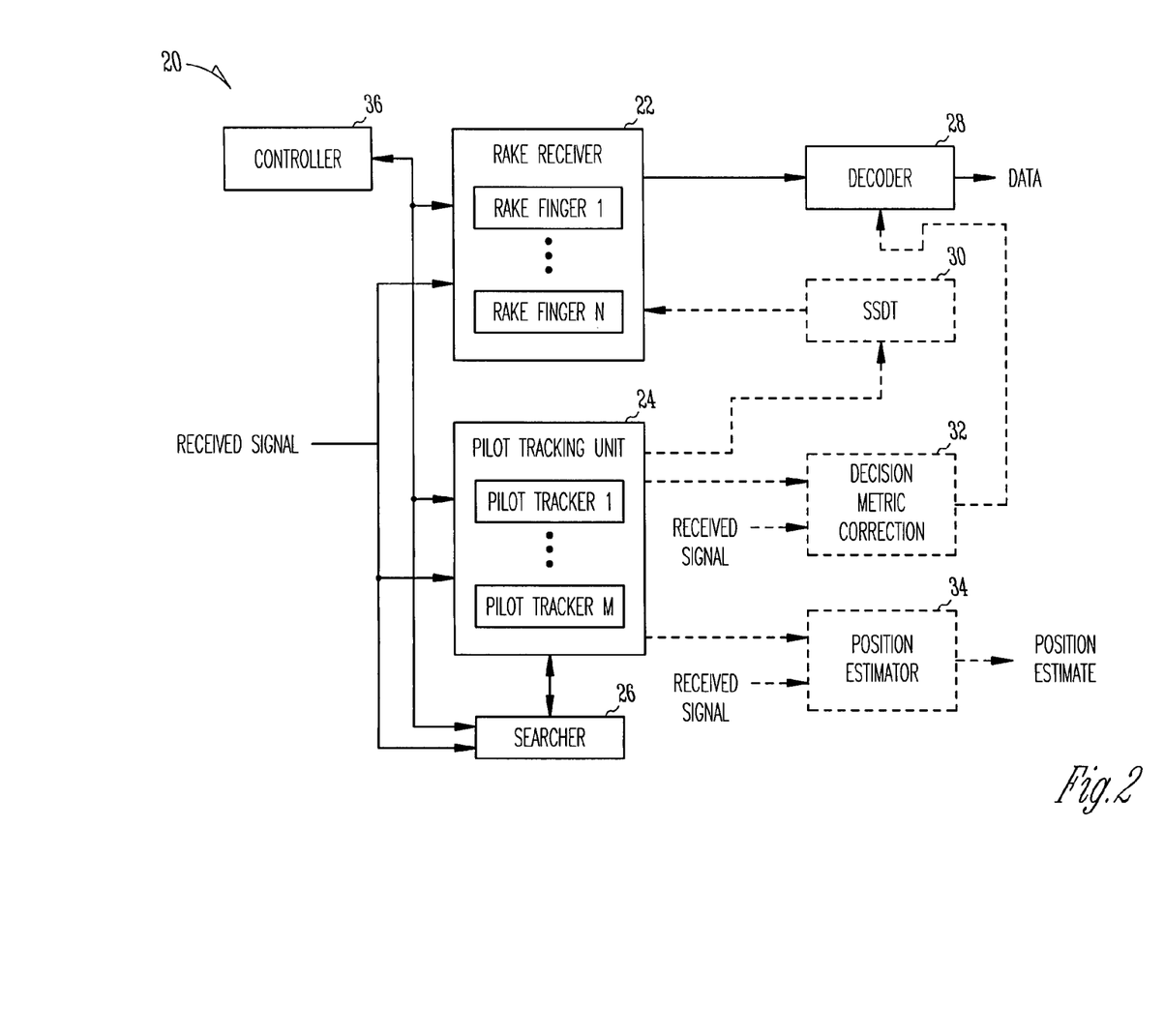
FIG. 2 is a block diagram illustrating a receiver system in accordance with an embodiment of the present invention.

FIG. 2 is a block diagram illustrating a receiver system 20 in accordance with an embodiment of the present invention. The receiver system 20 may be used, for example, within any communication device requiring a CDMA receiver (e.g., a cellular telephone, pager, personal digital assistant or portable computer with wireless transceiver functionality, etc.) for use in a CDMA-based wireless communication system (e.g., system 10 of FIG. 1). As illustrated, the receiver system 20 includes: a rake receiver 22, a pilot tracking unit 24, a searcher 26, a decoder 28, an optional site selection diversity transmission (SSDT) unit 30, an optional decision metric correction unit 32, an optional position estimator 34, and a controller 36. It should be appreciated that the individual blocks illustrated in FIG. 2 (and in other block diagrams herein) are functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above.

Each base station in a cellular system typically transmits data-bearing signals to one or more users within a corresponding cell. Each base station also typically transmits pilot signals that may be used by the user's communication devices to, among other things, aid detection of the corresponding data-bearing signals. The information within the pilot signals is typically known within the individual user devices. As described previously, in a CDMA-based system, some or all of the data-bearing signals may have overlapping frequency spectrums. Likewise, the pilot signals may have frequency spectrums that overlap the spectrums of the data-bearing signals. The signal received by the receiver system 20 may include overlapping signal components from a number of different base stations. The receiver system 20 is operative for, among other things, recovering data from this received signal that corresponds to a local user associated with the receiver system 20.

The searcher 26 searches for new pilot signals within the received signal. In one approach, the searcher 26 identifies each new pilot signal within the received signal that meets a predetermined criterion (e.g., exceeds a predetermined signal strength threshold). When dealing with multi-path channels, each identified pilot signal usually corresponds to a single path of a corresponding channel. Similarly, when transmit diversity is being used, where multiple pilot paths are arriving from different transmit antennas of the same base station, each identified pilot may correspond to one of these multiple pilot paths. Once a new pilot signal has been identified by the searcher 26, a decision may be made as to whether the pilot signal will be tracked by the pilot tracking unit 24. If it is decided that the pilot signal is to be tracked, the pilot tracking unit 24 proceeds to continuously track the pilot signal over time. The pilot tracking unit 24 despreads each pilot signal being tracked and performs continuous time tracking and channel tracking (i.e., amplitude and phase estimation) for the signal. In at least one implementation, the pilot tracking unit 24 also performs frequency tracking for each pilot signal being tracked. In one approach, the pilot tracking unit 24 includes a number of pilot trackers (e.g., PILOT TRACKER 1, . . . , PILOT TRACKER M in FIG. 2) that each independently track a corresponding pilot signal identified by the searcher 26. Because the pilot signals are continuously and finely tracked by the pilot tracking unit 24, the accuracy of the time and channel (and possibly frequency) estimates is relatively high. The pilot tracking unit 24 may record the collected tracking information within a memory. In one implementation, the searcher 26 has access to this memory and uses the corresponding recorded information to help in the search process for new paths.

The pilot tracking unit 24 may be used to track a single type of pilot signal or a number of different types of pilot signal. For example, the pilot tracking unit 24 may be used to track both the primary and secondary pilot channels specified in the 3GPP standards document, "Physical Channels and Mapping of Transport Channels onto Physical Channels (FDD)," 3GPP TS 25.211. The pilot tracking unit 24 may also be used to track beacon pilot signals (i.e., pilot signals broadcast from a neighboring base station on the same frequency as the user device in order to enable the user device to identify a base station for potential hard handoff using a different frequency). Other types of pilot signal may also be tracked.

The rake receiver 22 processes the received signal to despread a data carrying portion of the received signal that corresponds to a local user (i.e., a user associated with the receiver system 20). The rake receiver 22 includes a number of rake fingers (e.g., RAKE FINGER 1, . . . , RAKE FINGER N in FIG. 2) that each separately despread a corresponding path of the wireless channel between an affiliated base station and the receiver system 20. The continuously tracked timing and channel information (and possibly frequency information) developed by the pilot tracking unit 24 may be used by the rake receiver 22 to accurately demodulate the received signal. In addition, this information may be used to optimize the assignment of the rake fingers to appropriate paths (e.g., within the controller 36). In addition to the initial assignment of the rake fingers, the continuously tracked timing and channel information may be used to make decisions on, for example, when to change the assignment of a particular rake finger to another path, when to turn off a particular rake finger, etc. in a dynamic manner. Because the timing and channel information is accurate and timely, it may be possible to reduce the number of rake fingers within the rake receiver 22 without significantly affecting rake performance. Further, the timing and channel information (and possibly frequency information) developed by the pilot tracking unit 24 may also be used to initialize a rake finger when it is first turned on, to avoid any transient degradations in detection.

In FIG. 2, the receiver system 20 is illustrated as having a single rake receiver 22. It should be appreciated that one or more additional rake receivers 22 may also be present within the receiver system 20 and the pilot tracking unit 24 may serve all of the rake receivers 22 in the system. For example, in one possible operational mode, data-bearing signals may be transmitted to a user from a single base station using multiple different codes. This may require multiple rake receivers. In another scenario, there may be multiple different data-bearing channels that a receiver has to demodulate (e.g., a data channel and an informational channel). Again, this may require multiple rake receivers.

The rake receiver 22 may combine the outputs of some or all of the individual rake fingers to form a single demodulated output signal (e.g., using maximal ratio combining). Alternatively, the rake receiver 22 may determine the best output from among the rake fingers to be used as the rake output signal. The output signal of the rake receiver 22 will typically consist of a coded baseband signal. The decoder 28 is provided to decode this output signal. The decoder 28 is not necessary if the output signal of the rake receiver 22 is not coded. The decoder 28 processes the output signal of the rake receiver 22 to recover the data associated with the local user. The decoder 28 can consist of any type of decoder including, for example, a convolutional decoder (e.g., a Viterbi decoder, a sequential decoder, a BCJR/MAP decoder, a log-MAP decoder, and others), a turbo decoder, a low density parity check (LDPC) decoder, a linear block codes decoder (e.g., Hadamard, Hamming, cyclic, Golay, BCH, Reed-Solomon decoders, and others), as well as other types of decoder.

The controller 36 controls and manages the resources of the rake receiver 22, the pilot tracking unit 24, and the searcher 26. In at least one embodiment, the controller 36 includes a module to decide which pilots identified by the searcher 26 are to be tracked by the pilot tracking unit 24 (based on, for example, the resources available within the pilot tracking unit 24, the signal strength or signal-to-noise ratio of the identified pilots, any base station priorities that may exist, etc.). The selection of identified pilots to be tracked by the pilot tracking unit 24 may be a dynamic process that continuously reevaluates the decision to track a particular pilot. In at least one embodiment, the controller 36 includes a module to decide which paths, that are tracked by the tracking unit 24, will be assigned to the fingers of the rake receiver 22 (based on, for example, the resources available within the rake receiver 22 and the pilot signal strength of the paths tracked by the pilot tracking unit 24). The controller 36 may also control the type of assignment (based on, for example, resources available for the rake receiver 22). For example, it may be a long-term assignment or a dynamic assignment that is updated frequently based on tracker measurements. Other control and management functions may also be implemented by the controller 36.

The pilot tracking unit 24 tracks a pilot signal corresponding to each one of the fingers of the rake receiver 22 (i.e., for each one of the corresponding paths). In addition, the pilot tracking unit 24 will also typically track one or more pilot signals that do not correspond to fingers of the rake receiver 22 (e.g., pilots associated with base stations other than the affiliated base station(s)). As will be discussed in greater detail, the information gathered by the pilot tracking unit 24 may be used to perform a variety of different functions within the receiver system 20. In at least one implementation, the pilot tracking unit 24 tracks all or most of the pilot signals that are identified by the searcher 26. The actual number of pilots tracked will typically be limited by the available resources within the pilot tracking unit 24 (e.g., the number of pilot trackers, etc.). A selection criterion may be defined for use in determining which of the identified pilots will be tracked within the pilot tracking unit 24. The selection criterion may be based upon, for example, pilot signal strength, pilot signal-to-noise ratio, resource availability, base station priorities (e.g., priority for affiliated base stations and/or base stations considered for soft-handoff), and/or other factors. The decision to cease tracking a pilot signal may also be based on a predetermined criterion. As described above, these decisions may be made by the controller 36.

Because the pilot tracking unit 24 continuously tracks the pilot signals, highly accurate and timely signal strength reports may be developed within the receiver system 20 for delivery to the corresponding network for use in making, for example, soft-handoff decisions. These signal strength reports will allow the network to more accurately and quickly select the optimal active set members for the receiver system 20. Because the active set members are more optimally determined, the performance of the rake receiver 22 may be improved and dropped calls may be reduced. In addition, because the signal strength reports are more accurate, the threshold used to add base stations in soft-handoff can be tightened, thus reducing unnecessary soft-handoff overhead.

In at least one embodiment of the present invention, the level of multi-path or antenna diversity associated with a base station is taken into account, in addition to signal strength, to make the soft-handoff decisions. For example, if signals are received from two different base stations with roughly the same signal-to-noise ratio (SNR), then the decision on which base station to include within the active set can favor the base station whose signal is being received with more diversity. Because the pilot tracking unit 24 continuously tracks pilot signals from base stations that are not within the active set, and will often track multiple paths associated with a single base station, the diversity information of each surrounding base station will often be available from the pilot tracking unit 24. In one possible approach, the diversity information corresponding to particular base stations is delivered to the network along with the signal strength report for use by the network in making a soft-handoff decision. In another possible approach, the diversity information assembled for a base station may be used within the receiver system 20 to weight the corresponding signal strength information for the base station. The modified signal strength information is then delivered to the network as part of the signal strength report for use in making the soft-handoff decision. Either one of these approaches may be implemented, for example, in software within the controller 36. As will be appreciated, many alternative techniques can also be used to make soft-handoff decisions based on base station diversity information developed by the pilot tracking unit 24.

In past CDMA receivers, the searcher unit was used to (a) detect new multi-path components that can be utilized by a corresponding rake receiver, and (b) periodically measure the energy of the active and neighboring base stations for use in making, for example, handoff decisions. By implementing a pilot tracking unit 24 in a CDMA receiver, a significant computational load may be lifted from the searcher as the searcher is no longer required to make the periodic energy measurements. Alternatively, the searcher may retain some of the functionality of periodic energy measurements for pilots not being tracked by the PTU, but at a significantly reduced level. However, the main purpose of the searcher becomes the identification of new signal paths of potential significance. By focusing its resources on the identification of new signal paths, the searcher 26 can identify new paths more quickly and accurately than searchers of the past having comparable resources. By using the pilot tracking unit 24 to measure the detected paths, the measurements that will be reported will be more accurate.

In order to maximize the use of macro-diversity while minimizing soft-handoff overhead, a site selection diversity transmission (SSDT) mode of operation has been developed (e.g., as part of the third generation 3GPP CDMA standard) that allows user equipment to quickly switch the identity of the base station presently servicing the equipment. In SSDT mode, only one base station transmits to the user equipment at a time, but it is the base station determined to be the best. With reference to FIG. 2, the optional SSDT unit 30 uses tracking information generated by the pilot tracking unit 24 to aid in the selection of the base station that will transmit to the receiver system 20 at a particular time. The selected base station information is then delivered to the rake receiver 22 for use in identifying the appropriate rake fingers to use in the demodulation. In the past, SSDT decisions had been made based upon relatively infrequent pilot measurements made within a searcher unit. In contrast, the continuous timing and channel information provided by the pilot tracking unit 24 enables the SSDT decisions to be made more accurately and quickly, thus enhancing receiver performance. In addition, because the SSDT decisions no longer rely on the searcher, the computational load on the searcher may be reduced considerably.

The optional decision metric correction unit 32 uses tracking information developed by the pilot tracking unit 24 to optimize one or more decision metrics used by the decoder 28 in decoding the data signals associated with the local user. As illustrated, the decision metric correction unit 32 may also use the received signal to optimize the decision metric(s). The algorithms used in decoders are typically based upon likelihood information (e.g., log likelihood ratio, etc.) that depends on the interference/noise levels seen by the receiver. In a CDMA system, most of this interference/noise comes from co-channel signals from the same cell and from other cells. The pilot tracking unit 24 can provide significant information about the level and character of the interference/noise in the form of pilot signal power levels and channel information. Because this information is continuously tracked for both the affiliated base station(s) and non-affiliated base stations, accurate and current information is continuously available for making the metric corrections. In this manner, the performance of the decoder 28 may be increased significantly.

The optional position estimator 34 is operative for estimating a present location of the receiver system 20 based on the tracking information developed by the pilot tracking unit 24. In one approach, for example, finely tracked timing estimates associated with multiple surrounding base stations are used within a time difference of arrival (TDOA) position location algorithm to estimate the current position of the receiver system 20. In such a technique, the propagation delay differential from several base stations may be computed within the receiver system 20 to determine the corresponding position. Other techniques for estimating the present location of the receiver system 20 using tracking information developed by the pilot tracking unit 24 may alternatively be used.

Figure 3:
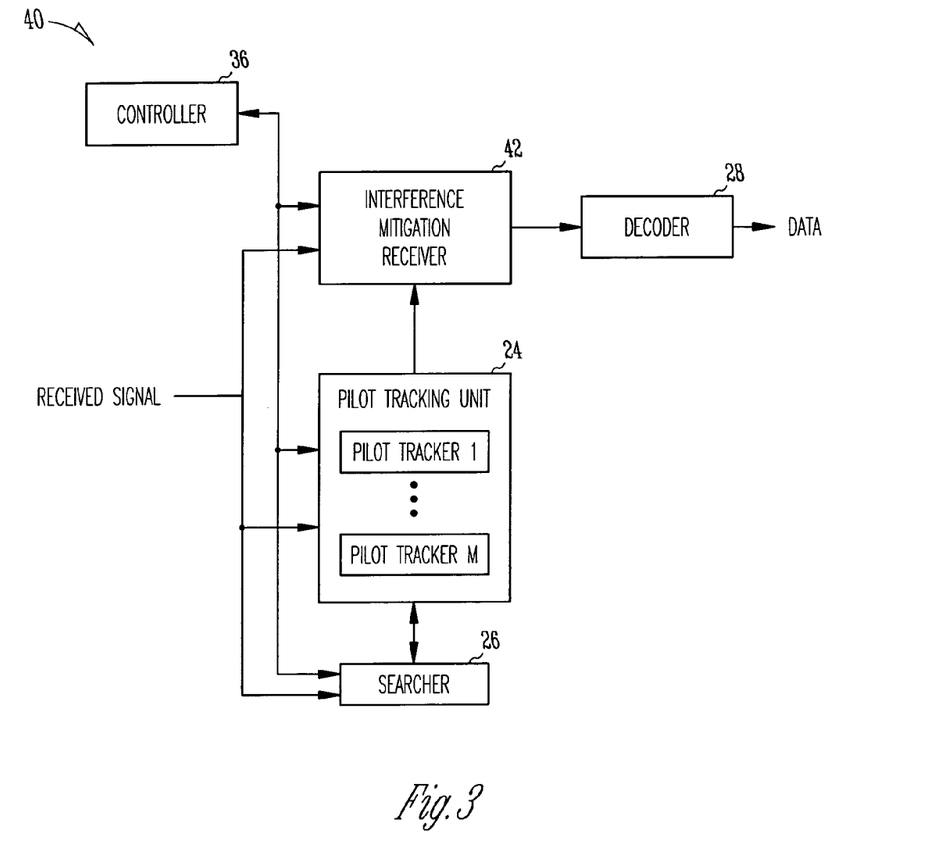
FIG. 3 is a block diagram illustrating a receiver system in accordance with another embodiment of the present invention.

FIG. 3 is a block diagram illustrating a receiver system 40 in accordance with an embodiment of the present invention. The receiver system 40 includes: a pilot tracking unit 24, a searcher 26, a decoder 28, a controller 36, and an interference mitigation receiver 42. The pilot tracking unit 24, the searcher 26, the decoder 28, and the controller 36 are similar to the structures described previously in connection with the system 20 of FIG. 2. The receiver system 40 may also optionally include an SSDT unit 30, a decision metric correction unit 32, and/or a position estimator 34 as described previously. The interference mitigation receiver 42 is a receiver that uses information relating to interference within the received signal to enhance the accuracy of the demodulation process. The interference mitigation receiver 42 obtains some or all of this interference related information from the pilot tracking unit 24. Because the pilot tracking unit 24 continuously and accurately tracks the significant pilot signals received by the receiver system 40, which may include both pilot signals associated with the affiliated base station(s) and pilot signals associated with non-affiliated base stations, there is typically a great deal of accurate and timely information available for use by the interference mitigation receiver 42 regarding the interference within the received signal. The interference mitigation receiver 42 can include, for example, an interference cancellation receiver, a multi-user detector (MUD), an equalization-based receiver, a receiver using multi-antenna spatial processing, and/or other receiver types. In at least one implementation, the interference mitigation receiver 42 includes pilot interference mitigation functionality to reduce the level of pilot-based interference within the received signal in a manner that enhances demodulation performance. The information generated by the pilot tracking unit 24 may also be used to accurately demodulate data-bearing interference signals within the received signal for use in interference mitigation (e.g., within a MUD detector, etc.). It should be appreciated that multiple interference mitigation receivers 42 may be provided and the pilot tracking unit 24 may service each of the these receivers.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment. Thus, the following claims are hereby incorporated into the detailed description, with each claim standing on its own as a separate embodiment of the invention.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A receiver system comprising:
a searcher to identify pilot signals within a received signal, said pilot signals corresponding to a plurality of remote base stations;
a pilot tracking unit to continuously track pilot signals identified by said searcher, said pilot tracking unit to track at least one pilot signal associated with an affiliated base station and, when identified by said searcher and selected for tracking, at least one pilot signal associated with a non-affiliated base station;
a receiver to demodulate data within the received signal that is associated with a predetermined user, said receiver using information gathered by the pilot tracking unit to demodulate said data; and
said receiver includes an interference mitigation receiver to reduce the negative effect of interference in the data demodulation using information gathered by the pilot tracking unit.

2. The receiver system of claim 1, wherein:
said pilot tracking unit performs continuous time tracking and continuous channel tracking for said at least one pilot signal associated with said affiliated base station and, when identified by said searcher and selected for tracking, for said at least one pilot signal associated with said non-affiliated base station.

3. The receiver system of claim 1, wherein:
said pilot tracking unit performs continuous time tracking, continuous channel tracking, and continuous frequency tracking for said at least one pilot signal associated with said affiliated base station and, when identified by said searcher and selected for tracking, for said at least one pilot signal associated with said non-affiliated base station.

4. The receiver system of claim 1, wherein:
said pilot tracking unit continuously tracks a majority of the pilot signals identified by said searcher.

5. The receiver system of claim 1, comprising:
a controller to determine which pilot signals identified by said searcher will be continuously tracked by said pilot tracking unit.

6. The receiver system of claim 5, wherein:
said controller determines which pilot signals identified by said searcher will be continuously tracked within said pilot tracking unit based on a predetermined selection criterion.

7. The receiver system of claim 6, wherein:
said predetermined selection criterion includes a condition related to pilot signal strength.

8. The receiver system of claim 1, comprising:
an SSDT unit to dynamically select a single base station to transmit user data to the receiver system based on tracking information gathered by the pilot tracking unit.

9. The receiver system of claim 1, wherein:
said receiver includes a rake receiver having a plurality of rake fingers, wherein said information gathered by the pilot tracking unit is used to dynamically optimize the assignment of rake fingers within the rake receiver.

10. The receiver system of claim 1, wherein:
said interference mitigation receiver includes a demodulation unit to demodulate data-bearing interference signal components based on information gathered by the pilot tracking unit.

11. The receiver system of claim 1, wherein:
said interference mitigation receiver includes a pilot interference reduction unit to reduce the level of pilot signal interference using information gathered by the pilot tracking unit.

12. The receiver system of claim 1, comprising:
a decoder to decode an output signal of the receiver; and
a decision metric correction unit to modify at least one decision metric used by the decoder to decode the output signal of the receiver based on information gathered by said pilot tracking unit.

13. The receiver system of claim 1, wherein:
said pilot tracking unit generates signal strength related information and diversity information for one or more remote base stations for use in making a soft-handoff decision.

14. The receiver system of claim 1, comprising:
a position estimator to estimate a present position of the receiver system using information gathered by said pilot tracking unit.

15. The receiver system of claim 14, wherein:
said position estimator estimates a present position of the receiver system using pilot signal timing estimates gathered by said pilot tracking unit in a time difference of arrival (TDOA) position location technique.

16. The receiver system of claim 1, wherein:
said pilot tracking unit includes a plurality of independent pilot trackers to each continuously track a single assigned pilot signal.

17. A method for processing a received signal within a communication device, comprising:
identifying pilot signals within the received signal, said pilot signals being associated with a plurality of remote base stations;
continuously tracking identified pilot signals for timing and channel information, wherein continuously tracking includes continuously tracking at least one pilot signal associated with an affiliated base station and continuously tracking, when identified during identifying pilot signals and selected for tracking, at least one pilot signal associated with a non-affiliated base station; and
using said continuously tracked timing and channel information to dynamically select a single remote base station to transmit user data to the mobile communication device in an SSDT mode of operation.

18. The method of claim 17, wherein:
continuously tracking includes only continuously tracking identified pilot signals that satisfy a predetermined selection criterion.

19. The method of claim 18, wherein:
said predetermined selection criterion is related to a signal strength of an identified pilot signal.

20. The method of claim 18, wherein:
said predetermined selection criterion gives priority to certain base stations.

21. The method of claim 17, comprising:
dynamically selecting identified pilot signals to be continuously tracked.

22. The method of claim 17, wherein:
continuously tracking identified pilot signals includes continuously tracking said pilot signals for frequency information.

23. The method of claim 17, comprising:
providing continuously tracked timing and channel information to a receiver for use in demodulating a received signal.

24. The method of claim 17, comprising:
using said continuously tracked timing and channel information to modify at least one decision metric used by a decoder to decode data associated with a predetermined user.

25. The method of claim 17, comprising:
using said continuously tracked timing and channel information to estimate a position of the mobile communication device.

26. The method of claim 17, comprising:
dynamically assigning rake fingers within a rake receiver based on said continuously tracked timing and channel information.

27. A receiver system comprising:
a searcher to identify pilot signals within a received signal, said pilot signals corresponding to a plurality of remote base stations;
a pilot tracking unit to continuously track pilot signals identified by said searcher for timing and channel information, said pilot tracking unit to track at least one pilot signal associated with an affiliated base station and, when identified by the searcher and selected for tracking, at least one pilot signal associated with a non-affiliated base station;
at least one rake receiver to demodulate data within the received signal that is associated with a corresponding user, said at least one rake receiver having a plurality of rake fingers;
a controller to manage the operation of said searcher, said pilot tracking unit, and said rake receiver, wherein said controller includes a selection module to select individual pilot signals identified by the searcher to be continuously tracked by the pilot tracking unit; and
said at least one rake receiver including an interference mitigation receiver to reduce the negative effect of interference in the data demodulation using information gathered by the pilot tracking unit.

28. The receiver system of claim 27, wherein:
said controller includes a rake finger assignment module to dynamically assign rake fingers to individual paths based on the timing and channel information developed by the pilot tracking unit.

29. The receiver system of claim 27, wherein:
said controller includes a module to assemble base station diversity information from the pilot tracking unit for use in making soft-handoff decisions.

30. The receiver system of claim 27, wherein:
said pilot tracking unit continuously tracks a majority of the pilot signals identified by said searcher.

31. A communication device comprising:
a searcher to identify pilot signals within a received signal, said pilot signals corresponding to a plurality of base stations;
a pilot tracking unit to continuously track selected pilot signals identified by said searcher;
at least one rake receiver to demodulate data within a received signal, said at least one rake receiver having a plurality of rake fingers;
a controller to select pilot signals identified by said searcher to be tracked by said pilot tracking unit, said controller to select said pilot signals to be tracked based on a predetermined selection criterion, wherein said predetermined selection criterion permits a pilot signal that is not assigned to a rake finger of said at least one rake receiver to be tracked by said pilot tracking unit;
said at least one rake receiver including an interference mitigation receiver to reduce the negative effect of interference in the data demodulation using information gathered by the pilot tracking unit; and said interference mitigation receiver includes a demodulation unit to demodulate data-bearing interference signal components based on information gathered by the pilot tracking unit.

32. The communication device of claim 31, wherein:

said controller considers resources available within said pilot tracking unit to select pilot signals to be tracked by said pilot tracking unit.

33. The communication device of claim 31, wherein:

said controller considers signal strength related parameters of the identified pilot signals to select pilot signals to be tracked by said pilot tracking unit.

34. The communication device of claim 31, wherein:

said controller considers priorities given to certain base stations to select pilot signals to be tracked by said pilot tracking unit.

35. The communication device of claim 31, wherein:

said controller is programmed to periodically reevaluate a decision to track a particular pilot signal within said pilot tracking unit.

36. The communication device of claim 31, wherein:

said predetermined selection criterion permits both affiliated and non-affiliated base stations to be tracked by said pilot tracking unit.

37. The communication device of claim 31, wherein:

said predetermined selection criterion permits all pilot signals identified by said searcher to be selected for tracking.

38. A communication device for use within a communication system implementing code division multiple access (CDMA), comprising:

a pilot tracking unit to continuously track selected pilot signals associated with a plurality of base stations;

at least one rake receiver to demodulate data within a received signal that is associated with a user of the communication device, said at least one rake receiver having a plurality of rake fingers;

a controller to assign rake fingers within said at least one rake receiver to individual paths associated with the received signal based on information developed by the pilot tracking unit;

said at least one rake receiver includes an interference mitigation receiver to reduce the negative effect of interference in the data demodulation using information gathered by the pilot tracking unit; and said interference mitigation receiver includes a pilot interference reduction unit to reduce the level of pilot signal interference using information gathered by the pilot tracking unit.

39. The communication device of claim 38 wherein:

said selected pilot signals are selected based upon a selection criterion that permits a pilot signal that is not assigned to a rake finger of said at least one rake receiver to be tracked by said pilot tracking unit.

40. The communication device of claim 38 wherein:

said controller dynamically assigns rake fingers to individual paths based on a predetermined assignment criterion.

41. The communication device of claim 40 wherein:

said predetermined assignment criterion considers the resources available within said at least one rake receiver.

42. The communication device of claim 40 wherein:

said predetermined assignment criterion considers a signal strength related parameter associated with pilot signals tracked by the pilot tracking unit.

43. The communication device of claim 38 wherein:

said controller is programmed to determine whether an assignment of a rake finger will be a long-term assignment or a dynamic assignment.

44. The communication device of claim 38 wherein:

said pilot tracking unit continuously tracks said selected pilot signals for timing and channel information.

45. The communication device of claim 38 wherein:

said pilot tracking unit continuously tracks said selected pilot signals for timing, channel, and frequency information.

46. A method for use within a wireless communication system comprising:

obtaining base station related information that was assembled by continuously tracking selected base station pilot signals received by a communication device, said selected base station pilot signals including a pilot signal that is not presently assigned to a rake finger within the communication device;

choosing an active set of base stations for the communication device based on said base station related information;

using said continuously tracked timing and channel information to dynamically select a single remote base station to transmit user data to the mobile communication device in an SSDT mode of operation; and using said continuously tracked timing and channel information to modify at least one decision metric used by a decoder to decode data associated with a predetermined user.

47. The method of claim 46, wherein:

said base station related information includes detailed signal strength reports for base stations about the communication device.

48. The method of claim 46, wherein:

said base station related information includes multi-path diversity information for base stations about the communication device.

49. The method of claim 46, wherein:

said base station related information includes antenna diversity information for base stations about the communication device.

50. The method of claim 46, wherein:

said base station related information includes signal strength reports for base stations about the communication device that have been modified based on at least one of the following: multi-path diversity information for base stations about the communication device and antenna diversity information for base stations about the communication device.

51. The method of claim 46, wherein:

obtaining base station related information and choosing an active set of base stations are performed at a network location within the wireless communication system.

52. The method of claim 51, further comprising:

transmitting information identifying said active set of base stations to the communication device.

53. A method for use within a wireless communication system comprising:

continuously tracking selected pilot signals received by a communication device from a plurality of base stations to generate base station information, said selected pilot signals including a pilot signal that is not presently assigned to a rake finger within the communication device;

selecting a base station to transmit data to the communication device in a site selection diversity transmission (SSDT) mode of operation based on said base station information using said continuously tracked timing and channel information to dynamically select a single remote base station to transmit user data to the mobile communication device in an SSDT mode of operation; and using said continuously tracked timing and channel information to estimate a position of the communication device.

54. The method of claim 53, wherein:

continuously tracking includes continuously tracking said pilot signals for timing and channel information.

55. The method of claim 53, wherein:

continuously tracking includes continuously tracking said pilot signals for timing, channel, and frequency information.

56. The method of claim 53, wherein:

said pilot signals that are continuously tracked are selected for continuous tracking from pilot signals identified by a searcher within the communication device.

57. The method of claim 53, wherein:

selecting a base station is performed within the communication device.

58. A method for use within a wireless communication system comprising:

continuously tracking selected pilot signals received by a mobile communication device from a plurality of base stations to generate base station information, said selected pilot signals including a pilot signal that is not presently assigned to a rake finger within the mobile communication device;

using said continuously tracked timing and channel information to dynamically select a single remote base station to transmit user data to the mobile communication device in an SSDT mode of operation; and estimating a position of the mobile communication device based on said base station information.

59. The method of claim 58, comprising:

dynamically adjusting the pilot signals that are selected for continuous tracking.

60. The method of claim 58, wherein:

estimating a position of the communication device includes using time difference of arrival (TDOA) techniques.

61. The method of claim 58, wherein:

estimating a position of the communication device is performed within the communication device.

* * * * *